United States Patent [19]

Davis, Jr. et al.

[11] 3,708,695

[45] Jan. 2, 1973

[54] HIGH SPEED SWITCH WITH COMPLEMENTARY OUTPUTS

[75] Inventors: William M. Davis, Jr., Vestal; Richard A. Windya, Binghamton, both of N.Y.

[73] Assignee: The Singer Company, Binghamton, N.Y.

[22] Filed: Oct. 19, 1971

[21] Appl. No.: 190,598

[52] U.S. Cl. ..................307/237, 307/297, 307/244, 307/262, 307/317, 328/57, 328/172, 330/30 D

[51] Int. Cl. .......H03k 1/14, H03k 5/08, H03k 17/74

[58] Field of Search..307/213, 215, 218, 235 R, 237, 307/241, 242, 244, 257, 259, 262, 296, 297, 317; 328/57, 171, 172, 151; 330/30 D

[56] References Cited

UNITED STATES PATENTS

| | | | |
|---|---|---|---|
| 2,676,286 | 4/1954 | Buchner | 328/146 X |
| 2,853,630 | 9/1958 | Lane et al. | 307/237 X |
| 3,508,076 | 4/1970 | Winder | 307/296 X |
| 3,522,443 | 8/1970 | Kanter | 307/241 X |
| 3,590,274 | 6/1971 | Marley | 307/297 X |
| 3,622,801 | 11/1971 | Stone | 307/262 |

*Primary Examiner*—Herman Karl Saalbach
*Assistant Examiner*—L. N. Anagnos
*Attorney*—Francis L. Masselle

[57] ABSTRACT

A high speed switching circuit is shown which provides highly accurate complementary outputs in which a first stage develops two voltages, one a junction drop above and one a junction drop below an internal reference and selectively applies them to two output lines as a function of the logic level of an input signal, a bipolar current source uses the two voltages to select the direction of the current to be supplied on two lines to an output stage and the output stage comprising four pairs of matched catching diodes connected on one side to positive and negative output references and on the other through a resistor to ground causes the current to split through the diodes in the properly biased pairs in turn causing equal drops across the diodes resulting in output voltages equal to the output references.

10 Claims, 1 Drawing Figure

PATENTED JAN 2 1973 3,708,695
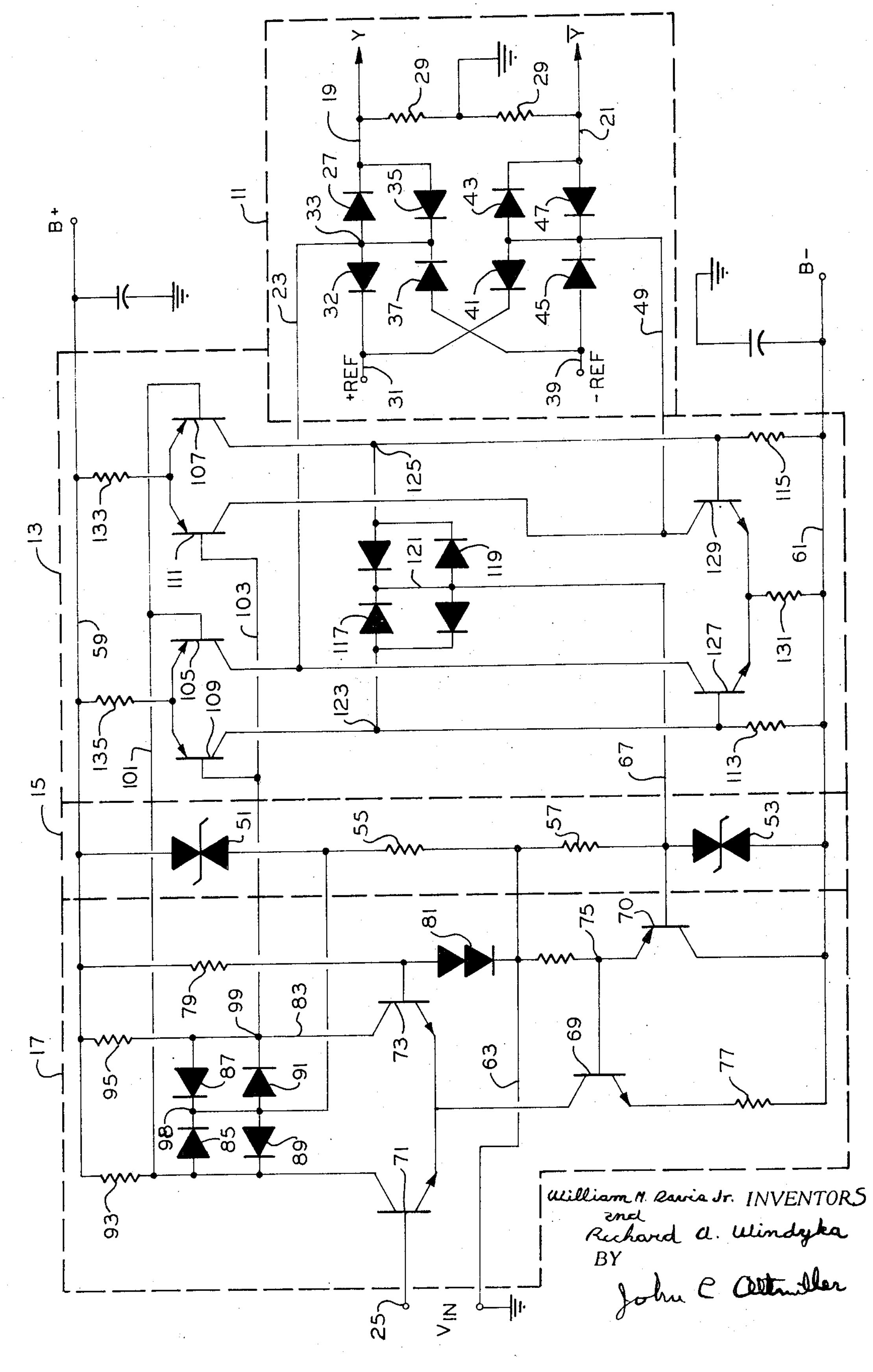
William M. Davis Jr. and Richard A. Windyka INVENTORS
BY
John E. Altmiller

HIGH SPEED SWITCH WITH COMPLEMENTARY OUTPUTS

This invention relates to switching circuits in general and more particularly to a high speed complementary switch having highly accurate output levels.

The levels supplied by conventional logic blocks are subject to drift due to temperature and other factors and are thus not suitable where highly stable and accurated output levels are required. The circuit of the present invention provides a pair of complementary output levels which are highly stable and accurate and in addition operates at very high speeds.

It is the principle object of this invention to provide a switch having highly stable and accurate output levels. Another object is to provide such a switch which has a fast response. Still another object is to provide such a switch with complementary outputs.

A further object is to provide a switch which is insensitive to power supply variations.

It is also an object to provide a switch which will operate with relatively inaccurate input logic levels.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which the FIGURE is a circuit diagram of the preferred embodiment of the present invention.

For ease of understanding of the circuit in the FIGURE has been divided into four basic blocks indicated by dotted lines. Block 11 is the output stage, block 13 a bi-polar current source, block 15 a positive and negative reference and block 17 an input comparator stage.

As noted above the desired outputs are to be complementary and highly accurate. The output stage 11 is heart of the circuit. The outputs Y and $\overline{Y}$ are provided on lines 19 and operation respectively. The operation of only the Y output will be described in detail since the $\overline{Y}$ output operates in exactly the same manner. The manner of obtaining high speed throughout the circuit is through the use of current-mode logic in which transistors are not allowed to saturate making faster switching times possible. Thus the outputs are made sensitive to a current provided on line 23. The current is controlled by current source 13 at a predetermined value and may be made to flow into or out of line 23 in response to input voltage changes at line 25 of block 17 as will be described below. For the moment assume that a positive current will be provided flowing in on line 23 for a positive logic signal at line 25 and a negative current flowing out for a negative logic signal. Both currents will be equal, for example 10ma (Specific values will be given throughout the application with an explanation of how they are interrelated. It should be obvious to those skilled in the art that other values may be used as long as the interrelation is maintained). Current flowing in on line 23 is indicative of a positive voltage on that line. A portion of the current will flow through diode 27 and resistor 29 to ground. The voltage will also be clamped to the positive reference voltage on line 31 through diode 32 causing current to flow through that path. If the current through resistor 29 is made to produce a voltage drop equal to the reference, the voltage on line 19 will equal the voltage on line 31 and the currents through the matched diodes 32 and 27 will also be equal. If the current on line 23 is 10ma as assumed above and the reference 5 volts, then a resistor 29 may be about 1 K to provide about 5ma to flow through each diode. With a 5 volt reference line 23 will be 0.7v above the reference and the Y output on the other side of diode 27 0.7v below line 23 or also 5v. Thus by matching diodes and the currents through them the voltage at Y on line 19 will equal the reference voltage.

If current is drawn out of the output stage on line 23 indicating a negative voltage on line 23 the matched pair of diodes 35 and 37 will work in a similar manner clamping the output to the negative reference on line 39. In normal use it is contemplated that the voltages on lines 31 and 39 will be the same absolute value, one positive and one negative. The $\overline{Y}$ output on line 21 comprising the matched pairs 41 and 43 and 45 and 47 and having an input on line 49 works in the same fashion. For complementary outputs it is only necessary that when current is positive on line 23 it be negative on line 49 and vice versa.

The reference voltage generator 15 comprises two zener diodes 51 and 53 and two resistors 55 and 57 connected between lines 59 and 61 which are the positive and negative supply voltages. The junction of resistors 55 and 57 is connected to ground line 63. The supply voltages will be assumed to be 15 volts and the zener voltages 5.1 volts. This will result in a reference on line 65 of +9.9 volts and on line 67 of −9.9 volts. The supply voltages and Zener voltages may be selected at other values to suit the particular application for which the circuit is used.

At this point it might be best to consider the input stage 17. Transistors 69 and 70 are biased to be on at all times and form a current source for a pair of transistors 71 and 73. The reference voltage on line 67 is provided to transistor 70 holding it on. The output of transistor 70 is connected to the base of transistor 69. The voltage at point 75 will be approximately −9.2 volts (assuming the reference of −9.9v and a junction drop of 0.7 volts. A value of 0.7 volts drop across junctions will be assumed throughout the remainder of the application). If transistor 69 is matched to transistor 70 its emitter will then be at the reference voltage of −9.9 and by selecting the value of resistor 77 the amount of current drawn by the current source may be controlled. For example a resistor of 510 ohms will provide a current of 10ma. This was found to be a good operating value but is not critical.

The 10ma drawn by transistor 69 must come from either transistor 71 or 73. Transistor 73 has on its base a voltage determined by double diode 81 connected between the positive supply and ground along with resistor 79. The double diode will cause a drop of about 1.4 volts keeping the base biased at that level. Input line 25 is designed to accept levels such as those provided by TTL logic. If a logic "0" (a voltage less than 1.4 volts) is provided on line 25 transistor 73 will be on.

For a logic "1" (voltage greater than 1.4 volts) transistor 71 will be on.

With transistor 73 on and providing a 10ma current to the current sink of transistor 69, 10ma of current must be supplied to its collector on line 83. To determine where this current will come from the diodes 85, 87, 89, and 91 and their assorted voltages must be examined. The diodes are all connected to the +9.9 volt reference at point 98. Current can flow through resistor 93 diode 85 and diode 91 to transistor 73. It may also flow through resistor 95 to transistor 73. Assume each of resistors 93 and 95 have a value of 1.2K ohms. The current through resistor 93 and diodes 85 and 91 will be (15 − 10.6)v/1.2K ohms or approximately 3.7ma. The current through resistor 95 will be (15 − 9.2)v/1.2 K ohms or approximately 4.8ma. The remainder of the required 10ma will be drawn from the reference 15 through diode 91.

As long as the input on line 25 remains at a logic zero transistor 73 will conduct and transistor 71 be held off. The two emitters are tied together and transistor 73 has 1.4 volts on its base. Thus both emitters will be at about 0.7 volts and a voltage of over 1.4 volts is needed to turn transistor 71 on. If a logic "1" of, for example, 3 volts appears on line 25, transistor 71 will be turned on and the emitters will be at a voltage of about 2.3 volts back biasing transistor 73 and turning it off.

In this state current will flow through transistor 71 via paths through resistor 93 and through resistor 95 and diodes 87 and 89 in a manner similar to that described above in connection with transistor 73. Now however point 97 will be at 9.2 volts and point 99 at 10.6 volts. These points are connected to lines 101 and 103 respectively which are the inputs to the current source 13. The operation of the input stage is summarized in the table below.

| Input (25) | TRANSISTOR 71 | 73 | Line 101 | Line 103 |
|---|---|---|---|---|
| Logic "0" $v<1.4v$ | OFF | ON | 10.6v | 9.2v |
| Logic "1" $v>1.4v$ | ON | OFF | 9.2v | 10.6v |

The required input for current stage 13 is as indicated above. That is, two voltages which are at levels which are two junction drops apart must be provided on two lines with the order controlled in response to the input logic level.

Each of lines 101 and 103 provide the base input to two transistors; line 101 to transistors 105 and 107 and line 103 to transistors 109 and 111. Transistors 109 and 105 and transistors 111 and 107 are matched pairs. The operation of the circuit will only be explained in detail for the condition where transistor 73 is on since operation in the two states is essentially the same.

With line 103 at 9.2 volts, transistor 109 will conduct. Since its base is at 9.2 volts its emitter will be at about 9.9 volts as will the emitter of transistor 105. Since line 101 has 10.6 volts on it, the base emitter junction of transistor 105 will be back biased and it will be off. In similar manner transistor 111 will be biased on and transistor 107 biased off. It is evident that with the opposite voltages on lines 101 and 103 the reverse would occur i. e. transistors 105 and 107 on and 109 and 111 off.

As in the input circuit the current from transistor 109 has a path through a resistor 113 and through a resistor 115 and two diodes 117 and 119. Diodes 119 and 117 are connected together and to the negative reference at point 121. Thus if point 121 is at −9.9 volts the points 123 and 125 will be at −9.2 and −10.6 volts respectively. This means the base of transistor 127 will be at −9.2 volts. Its collector over line 23 will be at the − Reference voltage of −5 volts and it will be conducting with its emitter at −9.9 volts. Transistor 129 with its base at −10.6 volts and its emitter at −9.9 volts will be biased off. Transistor 127 is connected to the B − of −15 volts through resistor 131. To have 10ma flow over line 23 through transistor 127 resistor 131 would have to be −9.9 (the emitter voltage) − (−15 B−) divided by 10ma or 510 ohms.

The only current path for transistor 111 with transistor 129 off is to the output circuit 11 on line 49. Again to obtain 10ma of current the emitter resistor 133 of transistor 111 must be 510 ohms. Thus transistor 111 will supply current into circuit 11 on line 49 and transistor 127 will draw it out on line 23. The current through transistor 109 will split up flowing partially through resistor 113 and partially through the diodes 117 and 119 in the same manner as that described in connection with transistors 71 and 73. Since for symmetrical operation transistor 109's emitter resistor 135 must also be 510 ohms it too will conduct 10ma. As with transistors 71 and 73 the current deficiency will be supplied by the reference 15.

When the voltages on lines 101 and 103 are reversed, transistor 127 will be off and transistor 129 on. As previously mentioned transistors 105 and 107 will also be on. Current will now flow out of the output circuit 11 on line 49 through transistor 129 and into the circuit 11 on line 23 through transistor 105.

The table below summarizes this portion of the circuit.

| Line 101 | Line 103 | On | Off | Line 23 | Line 49 |
|---|---|---|---|---|---|
| 9.2 | 10.6 | 107, 105 129 | 109, 111 127 | IN | OUT |
| 10.6 | 9.2 | 109, 111 127 | 107, 105 129 | OUT | IN |

In summary, an input stage provides in response to a logic input, voltage levels which are two junction drops apart on two lines the order of the voltages being determined by the input logic level. The two voltages are used to control two pairs of transistors which in turn control operation of a third pair resulting in currents on two lines the direction of the currents controlled by the order of the two input voltages. This current is then used in a final output stage of catching diodes to cause equal currents to pass through matched diodes and provide accurate and complementary voltage output levels.

The following is a list of semiconductors which have been used in the circuit:

| | |
|---|---|
| Transistors **71, 73** | |
| **127, 129** | 2N4124 |
| Transistors **69,** | 2N3904 |
| **70** | 2N3906 |
| Transistors **105, 107** | 2N4126 |
| **109, 111** | |
| All diodes | 1N914 |

Transistors 2N3904 and 2N3906 should be matched as should the 2N4126 and 2N4124 transistors used in the bipolar current source. With these semiconductors and the voltage current, and resistance values indicated above, output level swings of 10 volts were obtained with rise and fall times of approximately 10 nano seconds with virtually no relative delay between the two output transitions i. e. Y and $\overline{Y}$.

A few further advantages of the circuit should be noted. Since the reference voltages at the output are independent from the B+ and B− supplies their accuracy may easily be maintained. The B+ and B− supplies can vary without any serious effect on the circuit. For example assume the B+ supply dropped to 12 volts. Zener 51 in block 15 would still have a 5.1v drop across it making the reference and the lines 101 and 103, 3 volts below the levels described above. But the relative levels remains the same and switching occurs as before. Since line 59 is still 5.1 volts above the emitters of transistors 105, 107, 109 and 111 the required 10ma will still flow through the 510 ohms resistor and selected transistors insuring proper operation at the output.

Also, as previously mentioned, the input level may be anything below about 1.4 volts for a logic zero and anything above about 1.4 volts for a logic one allowing relatively inaccurate inputs to be used.

The output may be operated at any voltage level from 0 to about 9 volts (and higher values if adjustments are made for supply voltages higher than 15 volts and/or smaller valued zener diodes). The only requirement is that the resistors 29 be selected to drop a voltage equal to the reference with 5ma flowing through it. (Assuming a 10ma current being supplied).

As described above the circuit uses discrete components most of which are low cost semiconductors. It should be obvious to those skilled in the art that the circuit also lends itself to being built as a micro circuit.

Throughout the circuit NPN or PNP transistors have been used depending on the direction of current flow needed and the polarity of voltage provided. Obviously positive and negative voltages may be interchanged with corresponding changes in the negative of transistor used. In defining the type of transistor needed in each case PNP transistors can be designated as transistors of a positive polarity and NPN transistors as of a negative polarity. Thus it may be said of the circuit that all transistors must be of the same polarity as the voltage to which their emitter is connected whether directly or through a resistor or other transistor.

Thus a simple circuit using low cost components which provides highly accurate complementary outputs has been shown. Although a single embodiment has been shown and some possible modifications described it will be evident to those skilled in the art that other changes may be made without departing from the principles of the invention which is intended to be limited solely by the appended claims.

We claim:

1. A high speed switch for switching between two output levels in response to a two state input logic signal comprising:

a. a positive output voltage supply;

b. a negative output voltage supply;

c. a first pair of diodes having their anodes connected together at a common point and the cathode of one of said diodes connected to said positive output supply and the cathode of the other connected through a first resistor to ground; the output voltage of said switch being taken from across said resistor;

d. a second pair of diodes having their cathodes connected together and to said common point and the anode of one connected to said negative output supply and the anode of the other connected to said other cathode;

e. means, having the logic signal as an input, to supply to said common point a current of a predetermined magnitude the direction of said current being controlled by the state of said logic signal.

2. The invention according to claim 1 and further including third and fourth diode pairs and a second resistor to ground connected in similar fashion to said first and second pairs and said first resistor and said means to supply current further includes means to supply current of opposite polarity to that being supplied to said common point of said first and second pairs to the common point of said third and fourth pairs whereby a second output will be provided across said second resistor.

3. The invention according to claim 2 wherein said positive and negative output voltages are respectively +v and −v each with an absolute value v said predetermined currents are similarly +I and −I each with an absolute value I and the value of said resistor is 2v/I whereby complementary outputs will be provided.

4. The invention according to claim 2 wherein said means to supply current comprise:

a. a reference voltage generator providing from a voltage supply of a first polarity and a voltage supply of an opposite polarity a reference voltage of a first polarity and a reference voltage of an opposite polarity, said voltages being less than that of said voltage supplies;

b. an input comparator stage having said logic signals as an input and providing first and second outputs having voltages thereon which are one junction voltage above and one junction voltage below said first reference voltage, the voltages to be applied to each of said outputs being determined by the state of said logic signal;

c. a bi-polar current source having said first and second outputs as inputs and responsive to said outputs to provide on first and second lines opposite currents to said diode common points the direction of said currents being a function of the voltages on said comparator outputs.

5. The invention according to claim 4 wherein said current source comprises:

a. first and second transistors having their emitters connected together and connected through a resistor to said voltage supply of said first polarity, the base of the first transistor connected to the first comparator output and the base of said second transistor connected to the second comparator output;

b. third and fourth transistors having their emitter connected together and through a resistor to said voltage supply of said first polarity the base of the third transistor being connected to said first comparator output and the base of said fourth transistor connected to said second comparator output;

c. fifth and sixth transistors having their emitters connected together and through a resistor to said voltage supply of said opposite polarity the base of said fifty transistor being connected to the collector of said first transistor, and through a resistor to said opposite polarity the base of said sixth transistor connected to the collector of said fourth transistor, and through a resistor to said opposite polarity the collector of said fifth transistor being connected to the collector of said second transistor and to said first current output line, and the collector of said sixth transistor being connected to the collector of said third transistor and to said second current output line; and d. diode biasing means comprising first and second diodes with their anode and cathode respectively connected to the base of said fifth transistor and third and fourth diodes with their anode and cathode respectively connected to the base of said sixth transistor, the remaining terminals of all of said diodes connected together and to the reference voltage of said opposite polarity and all of said transistors being of the same polarity as the voltage to which their emitter is connected.

6. The invention according to claim 5 wherein the emitter resistors of said first and second, and said third and fourth transistors are equal the difference in voltage between said first supply voltage and said first reference voltage divided by said predetermined current and the emitter resistor of said fifth and sixth transistors has a value equal to the difference between said opposite supply voltage and said opposite reference voltage divided by said predetermined current.

7. The invention according to claim 5 wherein all of said transistors are matched.

8. The invention according to claim 4 wherein said reference voltage generator comprises a first zener diode and first dropping resistor connected between said first voltage supply and ground and a second zener diode and second dropping resistor connected between said opposite supply voltage and ground, the respective references being taken from the points at which said diodes and resistors are connected.

9. The invention according to claim 4 wherein said input comparator stage comprises:

a. a first transistor having its collector connected through a resistor to said first supply voltage and its base biased at predetermined voltage above ground said voltage being greater than one and less than the other logic state voltage;

b. an second transistor having its collector connected through resistor to said first supply voltage, its base connected to said logic input, and its emitter tied to the emitter of said first transistor both of said transistors being of the same polarity as the voltage to which their respective emitters are connected;

c. a current sink connected to the emitters of said first and second transistors; and d. first and second diodes having their anode and cathode respectively connected to the collector of said first transistor and to said first comparator output line and third and fourth diodes having their anode and cathode respectively connected to the collector of said second transistor and to said second comparator output line, the remaining terminals of said four diodes being connected together and to said reference of said first polarity.

10. The invention according to claim 9 wherein said current sink comprises:

a. a third transistor having its collector connected to said first and second emitters and its emitter connected through a resistor to said opposite supply voltage; and b. a fourth transistor having its emitter connected through a resistor to ground, its collector connected to said opposite supply voltage and its base connected to said opposite reference voltage and providing its emitter output to the base of said third transistor both of said transistors being of the same polarity as the voltage to which their emitters are connected.

* * * * *